United States Patent [19]
Mori

[11] Patent Number: 4,693,564
[45] Date of Patent: Sep. 15, 1987

[54] ELECTROCHROMIC DISPLAY DEVICE

[75] Inventor: Hiroshi Mori, Kanagawa, Japan

[73] Assignee: Sony Corporation, Tokyo, Japan

[21] Appl. No.: 793,127

[22] Filed: Oct. 30, 1985

[30] Foreign Application Priority Data

Oct. 31, 1984 [JP]  Japan .................... 59-229714

[51] Int. Cl.$^4$ .................................. G02F 1/17
[52] U.S. Cl. ...................................... 350/357
[58] Field of Search ........................... 350/357

[56] References Cited

U.S. PATENT DOCUMENTS

| | | | |
|---|---|---|---|
| 3,712,709 | 1/1973 | Kenworthy | 350/357 |
| 4,060,311 | 11/1977 | Green | 350/357 |
| 4,116,535 | 9/1978 | Ponjeé et al. | 350/357 |
| 4,326,777 | 4/1982 | Kohara et al. | 350/357 |
| 4,376,569 | 3/1983 | Bavltrop et al. | 350/357 |
| 4,473,695 | 9/1984 | Wrighton et al. | 350/357 |

*Primary Examiner*—Bruce Y. Arnold
*Attorney, Agent, or Firm*—Hill, Van Santen, Steadman & Simpson

[57] ABSTRACT

An electrochromic display device which comprises a pair of electrodes, at least one of which is a transparent display electrode and which are spaced from each other and an electrochromic solution placed inbetween the paired electrodes in contact therewith. The electrochromic solution is an aqueous solution comprising an N,N'-di(p-cyanophenyl)-4,4'-bipyridinium dihalide serving as an active substance, an alkali ferrocyanide as an ancillary redox material and an electrolyte. The electrolyte is a mixture of a hypophosphite ion, and a salt corresponding to the anion of the active substance and the alkali ion of the ancillary redox material. These materials have, respectively, certain ranges of molar concentrations.

8 Claims, 23 Drawing Figures

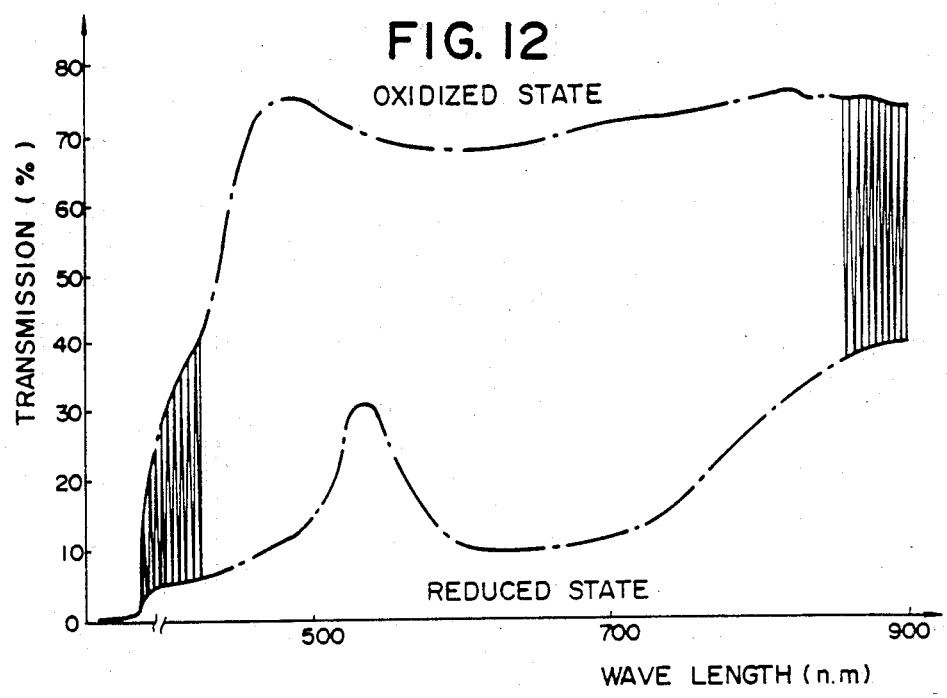
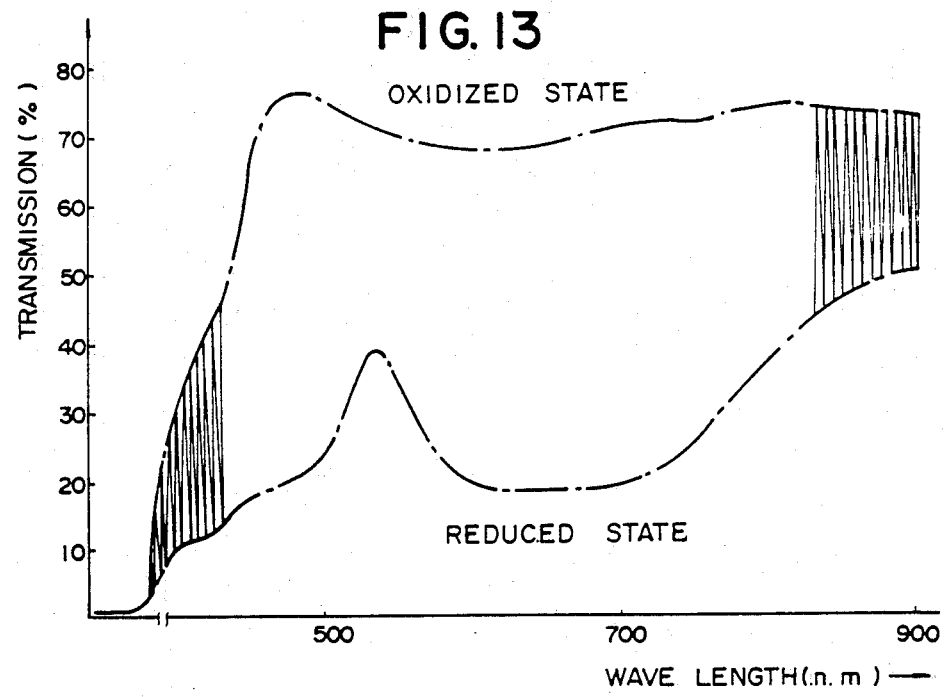

ELECTROCHROMIC DISPLAY DEVICE

BACKGROUND OF THE INVENTION

1. Field of the Invention

This invention relates to electrochromic display devices which are suitable for displaying figures or letters or also for X-Y matrix display and more particularly, to green color electrochromic display devices.

2. Description of the Prior Art

Electrochromic displays are of the non-luminous type and are able to display through reflected or transmitted light, so that they are advantageous in that one feels less fatigued on observation of the display over a long term, coupled with another advantage that the driving voltage is relatively low with a small power consumption.

Liquid electrochromic displays are known incluling a display in which viologen is used as an active substance and potassium ferrocyanide is used as an auxiliary redox material. In this display, the electron transfer reaction proceeds reversibly within the two pairs of redox systems consisting of viologen/potassium ferrocyanide, thereby forming or erasing a color.

In this type of electrochromic display, there is known a fairly long-lived system without involving "erasure failure" with regard to reddish purple electrochromic displays. For the display of variable messages or data, there are needed a variety of colors including green and blue colors.

Green color electrochromic displays are known. In one such display, there is used p-cyanophenyl viologen (which may be sometimes abbreviated as p-CV hereinafter) as an active substance, which exhibits a green color in the reduced state in an aqueous solution. For instance, Japanese Laid-open Patent Application No. 47-13293 teaches use of p-cyanophenyl viologen dichloride (p-CV2Cl).

The above type of liquid electrochromic display is so designed that a pair of facing electrodes, at least one of which is a display electrode, are in contact with an electrochromic solution. The color formation and erasure reaction of p-cyanophenyl viologen proceeds according to the oxidation and reduction reaction of the following formula (1)

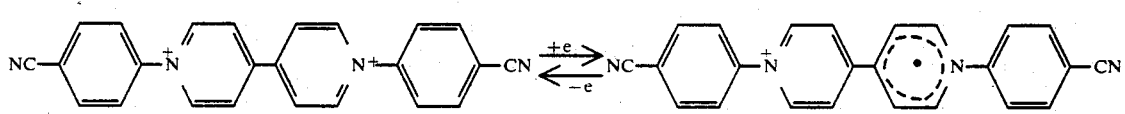
(1)

The reduced material formed on the electrode according to the formula (1) has a green color. In order to solve the problem of the "erasure failure" on the electrode, there is added an alkali ferrocyanide, as an auxiliary redox compound, which acts to facilitate the color erasure. The mechanism of facilitating the color erasure is considered to proceed according to the following formula (2):

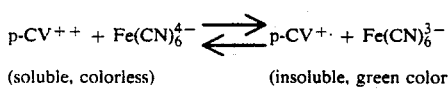
(2)

(soluble, colorless)   (insoluble, green color)

In practice, when the concentration of p-CV is increased in the green color electrochromic display making use of two pairs of redox systems of P-CV and an alkali ferrocyanide such as, for example, sodium ferrocyanide, the solution itself assumes the color. If the concentration further increases, flaky green crystals appear. This will lower the contrast and cause the display to be unfit for use. Accordingly, the molar concentration of p-CV must be below about 0.001 mole, which is disadvantageous in that a dense green color display cannot be obtained (Japanese Laid-open Patent Application No. 47-13293). In Table 1, there is shown a color change of solutions comprising varying concentrations of p-CV2Cl and sodium ferrocyanide, $Na_4[Fe(CN)_6]$.

TABLE 1

| $Na_4[Fe(CN)_6]$ | p-CV2Cl | | | | |
|---|---|---|---|---|---|
| | 0.001 M | 0.002 M | 0.004 M | 0.005 M | 0.010 M |
| 0.1 M | light yellow | light blue | light blue (after standing for 2 days, the solution became darkened) | separating of green crystals | separating of green crystals |
| 0.01 | | | | separating of green crystals | separating of green crystals |

As will be seen from Table 1, the elctrochromic display using P-CV/sodium ferrocyanide has the drawback that the solution assumes the color when p-CV is used at a concentration of 0.001M and separates out green crystals irrespective of the concentration of the alkali ferrocyanide when p-CV is used at a concentration of 0.005M, i.e. green crystals in the form of flakes appear.

Thus, the known green electrochromic displays which make use of two pairs of redox systems consisting of p-CV/alkali ferrocyanide, undesirably involve the coloration of the solution or the formation of green crystals, so that the molar concentration of p-CV cannot be increased to a satisfactory extent with an insufficient density of the green color in the display.

SUMMARY OF THE INVENTION

It is accordingly an object of the present invention to provide an electrochromic display device capable of generating green color from p-CV/alkali ferrocyanide, which overcomes the drawbacks of the prior art counterparts.

It is another object of the invention to provide a green color electrochromic display device which involves neither separating-out of flaky green crystals in the electrochromic solution nor coloration of the solution.

It is a further object of the invention to provide an electrochromic display device which can generate a dark green color and erase it in a repeated manner.

It is a still further object of the invention to provide an electrochromic display device which can be operated at low voltages with a reduced loss of the electrodes.

The above objects can be achieved, according to the invention, by an electrochromic display device which comprises a cell having facing electrodes, at least one of which is a display electrode and which are spaced from each other and an electrochromic solution filled between and in contact with the paired electrodes in a sealed manner. The electrochromic solution comprises an aqueous solution of an N,N'-di(p-cyanophenyl)-4,4'-bipyridinium dihalide as an active substance, an alkali ferrocyanide as an auxiliary redox material, and an electrolyte consisting of a hypophosphite ion, and a salt corresponding to the salt obtained from the anion of the active substance and the alkali ion of the auxiliary redox material. The active substance is used in an amount of 0.005 to 0.035M and the hypophosphite, as the electrolyte, is used in an amount not less than 0.5M. The salt should be not less than 0.25M.

BRIEF DESCRIPTION OF THE DRAWINGS

FIGS. 12 through 23 are, respectively, a transmission-wavelength characteristic.

DETAILED DESCRIPTION AND EMBODIMENTS OF THE INVENTION

Figure 1:
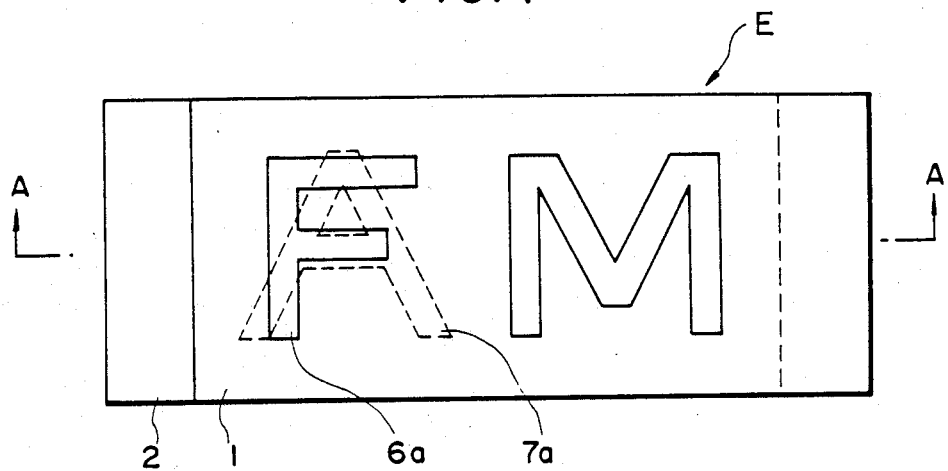
FIG. 1 is a schematic plan view of an electrochromic display device according to one embodiment of the invention.
Figure 2:
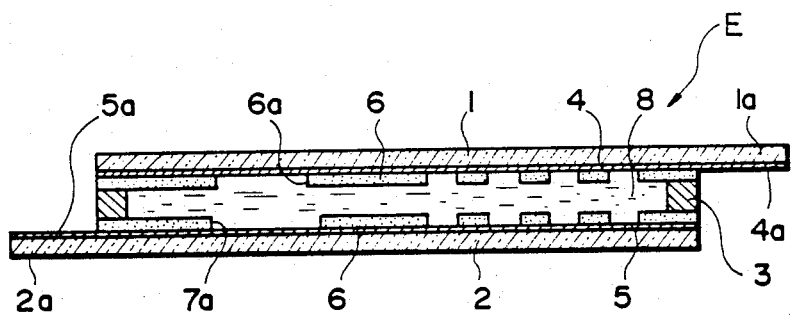
FIG. 2 is a section, taken along the line A—A of FIG. 2.

Reference is now made to the accompanying drawings and particularly, FIGS. 1 and 2 in which there is generally shown an electrochromic display device E. The device E has two glass substrates 1, 2 which are facing each other in substantial areas thereof except for extensions 1a and 2a and are sealed, as shown, through a spacer 3 to establish a liquid-tight space between the substrates 1,2. The substrates 1,2 have, respectively, electrodes 4,5 over the entire inner surfaces thereof. On the electrodes 4,5 are formed insulative masking layers 6,7, respectively. The insulative layers may be made, for example, of $SiO_2$. At least one of the electrodes 4,5 should be a transparent electrode for display purposes. This transparent electrode may be made of any known materials such as a compound oxide of In and Sn called "ITO". The insulative masking layers 6,7 are each selectively removed, as 6a or 7a, according to a desired pattern to be displayed. In FIGS. 1 and 2, the removed portions 6a, 7a correspond to "FM" and "AM", respectively. On the extensions 1a, 2a are formed conductive layers which may be the electrodes 4,5 or may be separately formed as connecting to the electrodes 4,5 for use as terminals 4a,5a, respectively.

An electrochromic solution, which will be described below, is filled in the space established between the electrodes 1,2.

The electrochromic solution is an aqueous solution of an active substance, an redox material and an electrolyte.

Examples of the active substance include N,N'-di(p-cyanophenyl)-4,4'-bipyridinium dihalides such as, for example, N,N'-bipyridinium dichloride (p-CV2Cl) and N,N'-di(p-cyanophenyl)-4,4'-bipyridinium dibromide.

The auxiliary redox materials include alkali ferrocyanides such as, for example, potassium ferrocyanide and sodium ferrocyanide.

The electrolyte is a mixture of a hypophosphite such as, for example, sodium hypophosphite ($NaH_2PO_2$), potassium hypophophite ($NaH_2PO_2$) or the like and a salt corresponding to the anion of the active substance and the alkali ion of the redox material, e.g. KCl or NaCl.

The active substance is used in an amount of 0.005 to 0.035M, the hypophosphite is used in amounts not less than 0.5M, and the salt such as KCl is used in amounts not less than 0.25M.

The amount of the alkali ferrocyanide used as the auxiliary redox material is chosen from the range of an equimolar amount to a fraction of the active substance.

The electrochromic solution is preferably prepared according to the following procedure. Distilled water into which nitrogen gas has been sufficiently charged in order to removed dissolved oxygen therefrom, is provided. Then, an active substance such as, for example, p-CV2Cl, is added to the distilled water and agitated, followed by further adding an alkali ferrocyanide such as, for example, potassium ferrocyanide ($K_4[Fe(CN)_6]$) or sodium ferrocyanide ($Na_4[Fe(CN)_6]$) and agitation. When the active substance is added in amounts over 0.005M as defined before, a precipitate separates out. On the way of the separating-out or after completion of the precipitation, an electrolytic salt such as potassium chloride (KCl) or sodium chloride (NaCl) is added, followed by addition of a hypophosphite ion such as sodium hypophosphite ($NaH_2PO_2$) or potassium hypophosphite ($KH_2PO_2$). The solution is agitated for about 30 minutes by the use of a magnetic stirrer.

According to the electrochromic display device of the invention, the electrochromic solution does not assume color and does not involve any precipitation of green crystals, and is thus a colorless electrochromic solution. Presumably, this is because of the addition of an excess of the salt corresponding to the salt consisting of the anion of the active substance and the alkali ion of the auxiliary redox material, e.g. KCl or NaCl.

The analysis of an iron content in the green crystals reveals that the precipitate is considered to have a composition of [2p-$CV^+$.Cl] which is formed according to the following reaction formula (3). If an excess of the salt such as potassium chloride, is added to the solution, the reaction (3) proceeds as moving the equilibrium to the left, so that the precipitate dissolves.

$$2\text{p-CV2Cl} + 2\text{ K}_4[\text{Fe(CN)}_6] \rightleftharpoons [\{2\text{p-CV}^+, \text{K}^+\}\text{Fe(CN)}_6^{3-}] + \text{K}_3[\text{Fe(CN)}_6] + 4\text{ KCl} \quad (3)$$

If the salt alone, such as KCl is used as the electrolyte, it becomes considerable that [p-CV$^+$.Cl], showing a green color, is kept unerased on the electrode as the redox reaction is repeated. This is overcome by addition of a hypophosphite such as sodium hypoposphite, i.e. the erasure on the electrode is facilitated with a long life of the display device.

The electrochromic display device according to the invention is in operation when subjected to a life test of a driving voltage of 0.4 to 0.9 V, a contrast ratio (which will be described in detail hereinafter) of 4 to 50, a response speed of 100 to 400 m/second, a charge consumption of 1.2 to 6.0 mC/cm$^2$ and a cycle life (color erasure and formation cycle) of $3.2 \times 10^7$ or over.

The present invention is more particularly described by way of examples.

EXAMPLE 1

The display device as shown in FIGS. 1 and 2 was used in this example. Into the liquid-tight space between substrates 1,2 was charged an electrochromic solution 8 having the following formulation.

| | |
|---|---|
| Active substance, p-CV2Cl | 0.01 M |
| Ancillary redox material, K$_4$[Fe(CN)$_6$] | 0.005 M |
| Electrolytes, NaH$_2$PO$_2$ | 1.0 M |
| KCl | 0.5 M |

The electrochromic solution was prepared according to the procedure described before.

When a direct current was applied between the electrodes 4, 5 of the resulting electrochromic display, a dark green color was observed through the window 6a of the electrode 4 from which the insulative layer 6 was removed. On the contrary, when the polarity was reversed, the dark green color was observed on the electrode 5 through the window 7a from which the insulative layer 7 was removed. In the instance of FIG. 1, the switching between of "FM" and "AM" was possible.

Figure 3:
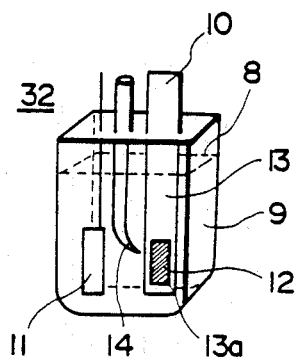
FIG. 3 is a perspective view of a cell for measuring a characteristic of the electrochromic display device.
Figure 4:
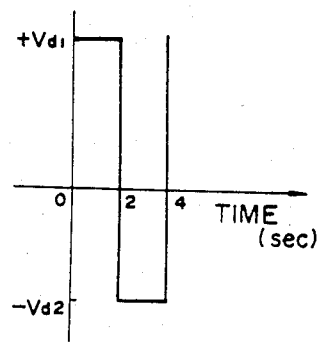
FIGS. 4 and 5 are waveforms of applied voltages for the characteristic measurement, respectively.
Figure 5:
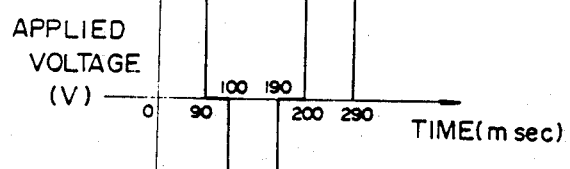

The electrochromic solution of Example 1 was subjected to measurement of characteristics. The measurement was carried out using an electrochromic cell 32 shown in FIG. 3. The cell 32 comprises a container 9 in which the electrochromic solution 8 was accomodated. A pair of facing electrodes 10, 11 and a reference electrode 14 are immersed in the solution 8. The electrode 10 is made of a glass substrate on which a transparent conductive ITO layer 12 having a sheet resistance of 30 ohms/square, on which a an insulative SiO$_2$ layer 13 having a window 13a with an area of 0.95 cm$^2$ is formed. The other electrode 11 consists of a platinum plate having an area of 4 cm$^2$ and the reference electrode 14 is a silver/silver chloride electrode. The measurement of the voltamogram was effected using a function generator HB-104, by Hokuto Denko, in combination with a potentiostat HA-301, by Hokuto Denko. The voltage sweeping rate was determined at 5 mV/second. The transmission change accompanied by color formation-erasure at the window 13a of the electrode 10 was determined using a double beam spectrophotometer 220A, by Hitachi Ltd. The cell was operated according to the voltage mode of a square wave shown in FIG. 4. A spectroscope was used to sweep at a rate of 60 nm/minute from the long to short wavelengths. The life test of the cell was effected using turnover pulses as shown in FIG. 5.

Figure 6:
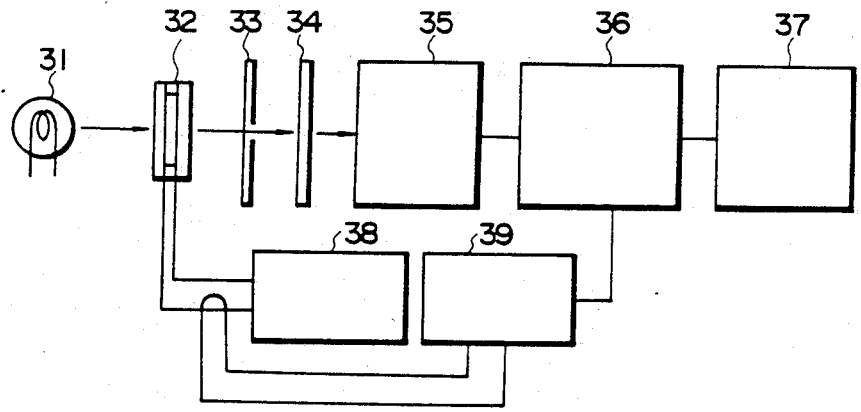
FIG. 6 is a block diagram of an optical system for measurement of a time-response characteristic.

The color density and the time-responsive speed of electric current were carried out using an optical system shown in FIG. 6. In the figure, indicated by 31 is a light source such as, for example, a tungsten lamp, by 32 is an electrochromic cell, by 33 is an iris, by 34 is a wavelength selector filter, by 35 is a photoelectric amplifier, by 36 is a digital memory, by 37 is an X-Y recorder, by 38 is a power source, and by 39 is a current probe.

The digital memory 36 used was DMS-6430 made by Iwasaki Tsushin K.K., the photoelectric amplifier 35 was R-928 made by Hamamatsu Photonix K.K., the current probe 39 was AM-503 made by Tectronix K.K., and the wavelength selector filter 34 was a silver interference filter KL-60 made by Toshiba Ltd.

Figure 7:
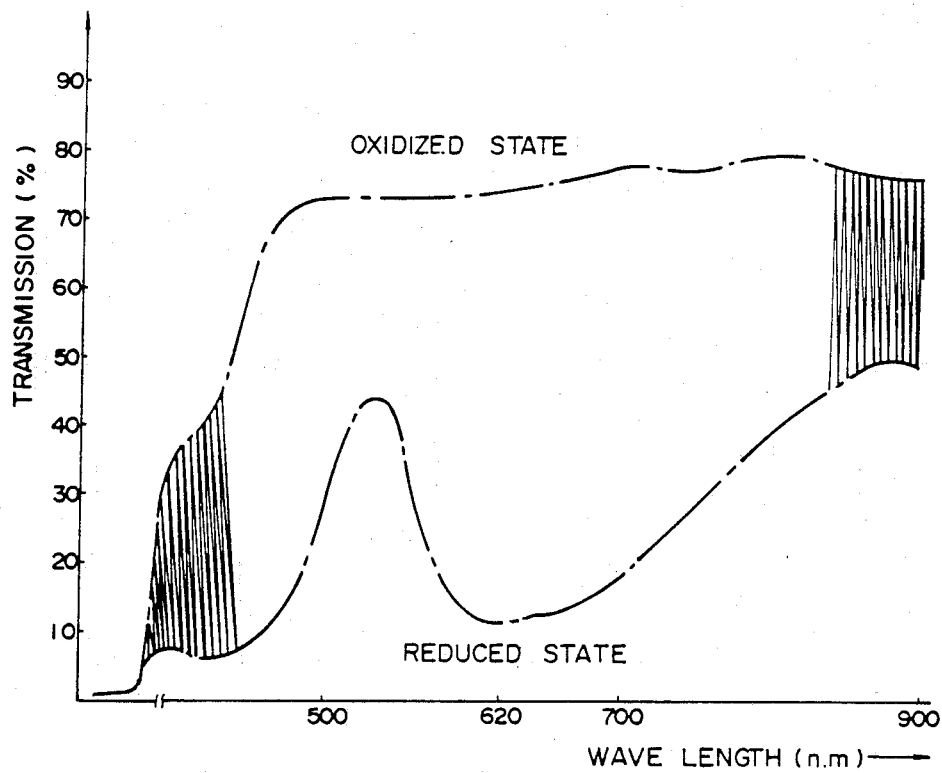
FIGS. 7 and 8 are, respectively, transmission-wavelength curves.

When the driving voltage for the cell 32 was determined such as $Vd_1 = +0.5$ V and $Vd_2 = -0.45$ V in FIG. 4, the results of the measurement of the wavelength-transmission characteristic are as shown in FIG. 7, revealing that the ratio C of the maximum transmission and the minimum transmission at 620 nm (hereinafter referred to simply as contrast C) was $73.6/11.0 = 6.69$. In the range where a high degree of visual appreciation is shown at 700 nm or below in the reduced state, the high transmission in the vicinity of a wavelength of 530 nm corresponding to green color is noted. This means that the green color is displayed on the electrode 10 in the reduced state.

Figure 8:
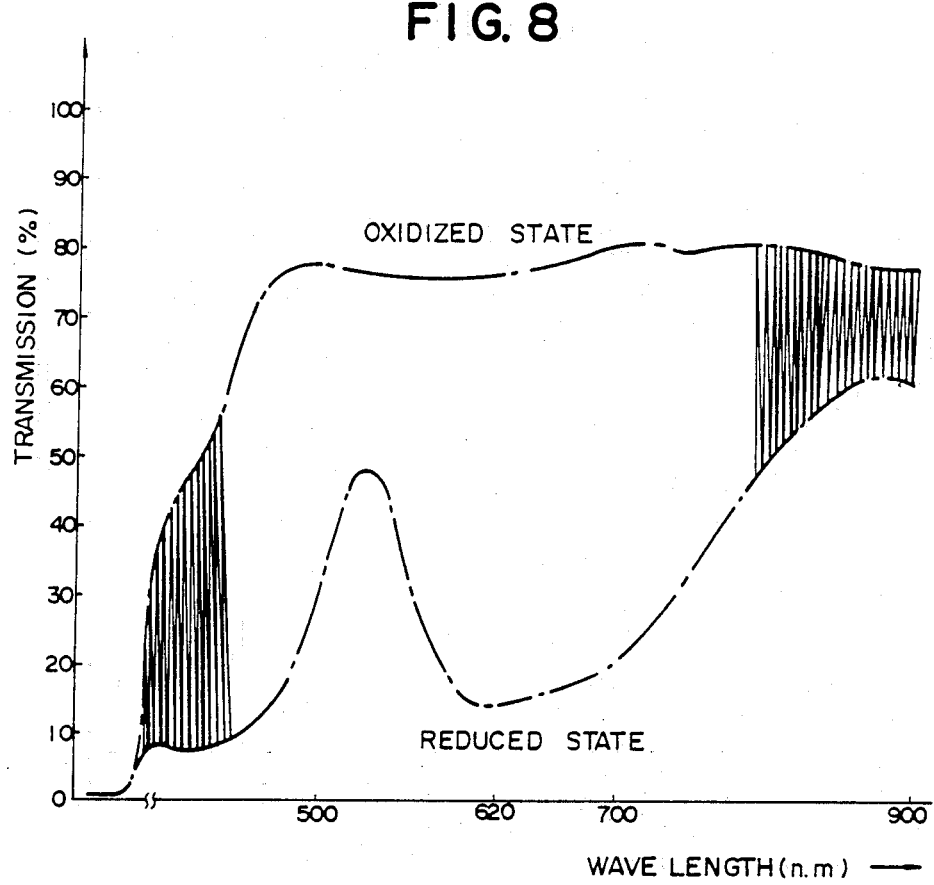

FIG. 8 shows similar results of the measurement of the transmission, in which $Vd_1 = +0.5$ V and $Vd_2 = -0.4$ V. The contrast C was found to be $76.0/13.6 = 5.59$.

Figure 9:
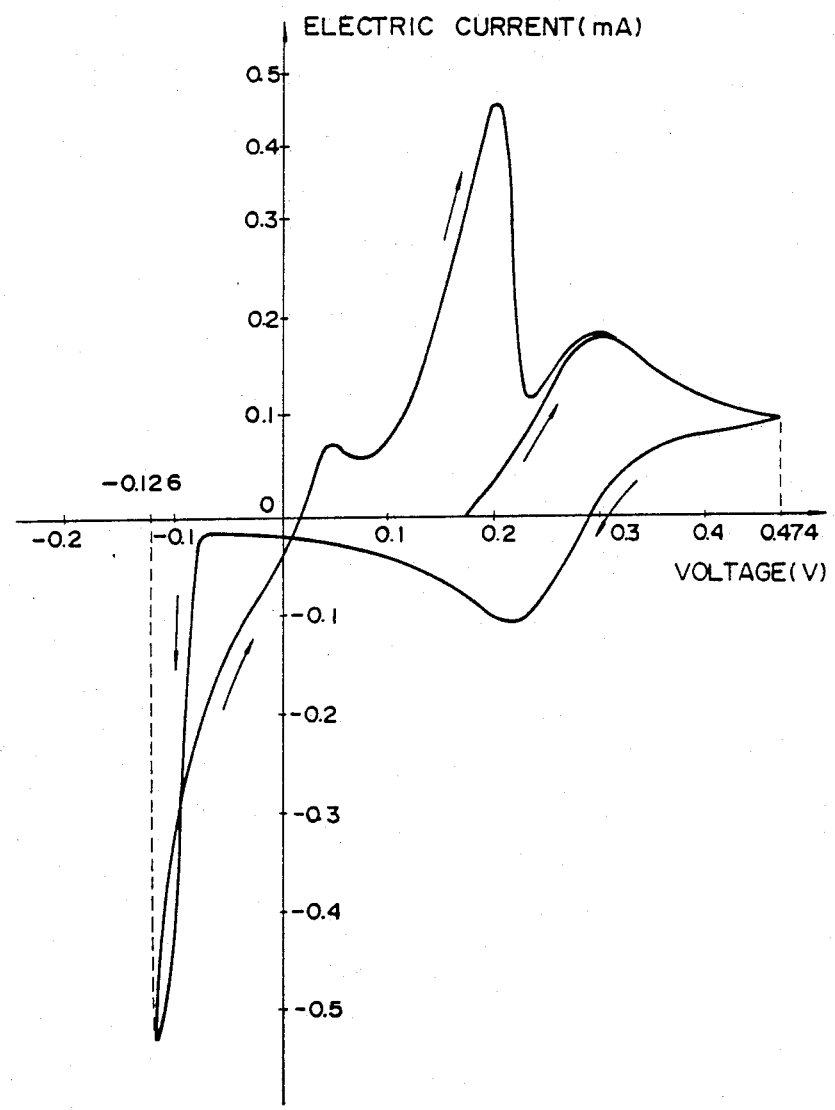
FIG. 9 is a voltamogram.
Figure 10:
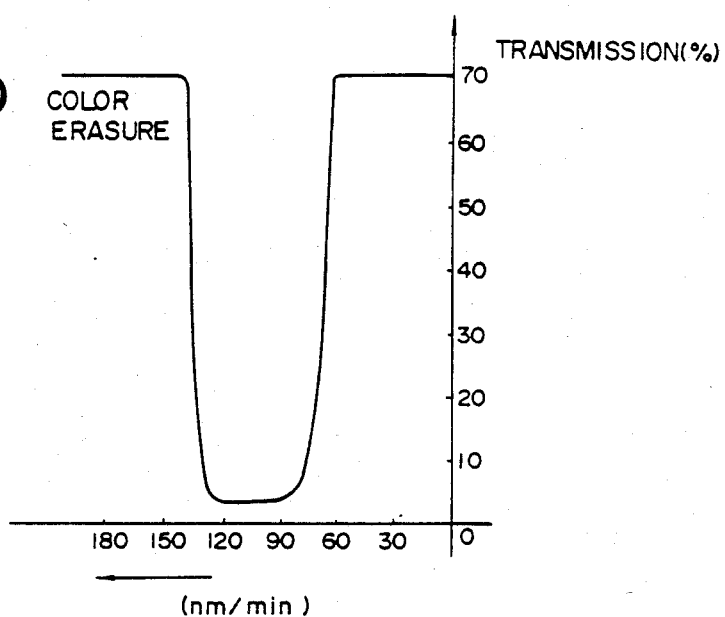
FIG. 10 is a characteristic curve showing the change of transmission relative to the sweeping of voltage.
Figure 11:
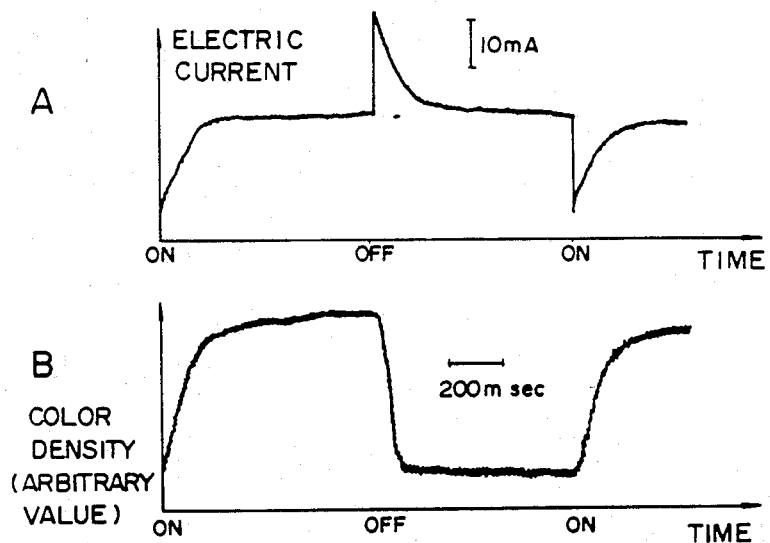
FIGS. 11A and 11B are, respectively, response characteristics, in terms of electric current and color density, in relation to time.

FIG. 9 shows a voltamogram which was obtained at a sweeping rate of 5 mV/second, demonstrating that electron adsorption or reduction takes places in the portion where the current abruptly decreases, so that the cell is effectively colored. In the portion where the current abruptly increases, the emission of electron takes place and thus the color is completely erased. The change of the transmission at 620 nm accompanied by the sweeping of the voltage is as shown in FIG. 10. The response speed or current change and the change in color density are also shown in FIGS. 11A and 11B.

EXAMPLE 2

An electrochromic solution having the following formulation was prepared in the same manner as in Example 1.

| | |
|---|---|
| Active substance, p-CV2Cl | 0.02 M |
| Ancillary redox material, K$_4$[Fe(CN)$_6$] | 0.01 M |
| Electrolyte, NaH$_2$PO$_2$ | 1.0 M |
| KCl | 0.5 M |

The thus prepared electrochromic solution was subjected to measurement of the transmission in the same manner as in Example 1. The results are shown in FIGS. 12 and 13. In FIG. 12 shows the case where $Vd_1 = +0.5$ V and $Vd_2 = -0.45$ V, in which the contrast C=67.4/9.5=7.09. In FIG. 13, $Vd_1 = +0.5$ V and $Vd_2 = -0.4$ V with a contrast C=67.0/17.7=3.79.

In Table 2, there are shown the results of a test where the cells of Examples 1 and 2 were applied with voltages between the facing electrodes at 0.7 V and 0.8 V so as to determine a response time for color formation and erasure and a response time per unit area.

TABLE 2

| Voltage (V) | Color Formation/ Color Erasure | Example 1 | | Example 2 | |
|---|---|---|---|---|---|
| | | Response Time (msec.) | Charge Quantity (mC/cm$^2$) | Response Time (msec.) | Charge Quantity (mC/cm$^2$) |
| 0.7 | Formation | 130 | 1.7 | 300 | 7.5 |
| | Erasure | 100 | | 400 | |
| 0.8 | Formation | 120 | 1.5 | 180 | 5.0 |
| | Erasure | 100 | | 280 | |

EXAMPLE 3

The general procedure of Example 1 was repeated except that $Na_4[Fe(CN)_6]$ was used as the auxiliary redox material and NaCl was used instead of KCl with the following formulation.

| | |
|---|---|
| Active Substance, p-CV2Cl | 0.01 M |
| Ancillary redox material, $Na_4[Fe(CN)_6]$ | 0.005 M |
| Electrolyte, $NaH_2PO_4$ | 1.0 M |
| NaCl | 0.5 M |

Figure 14:
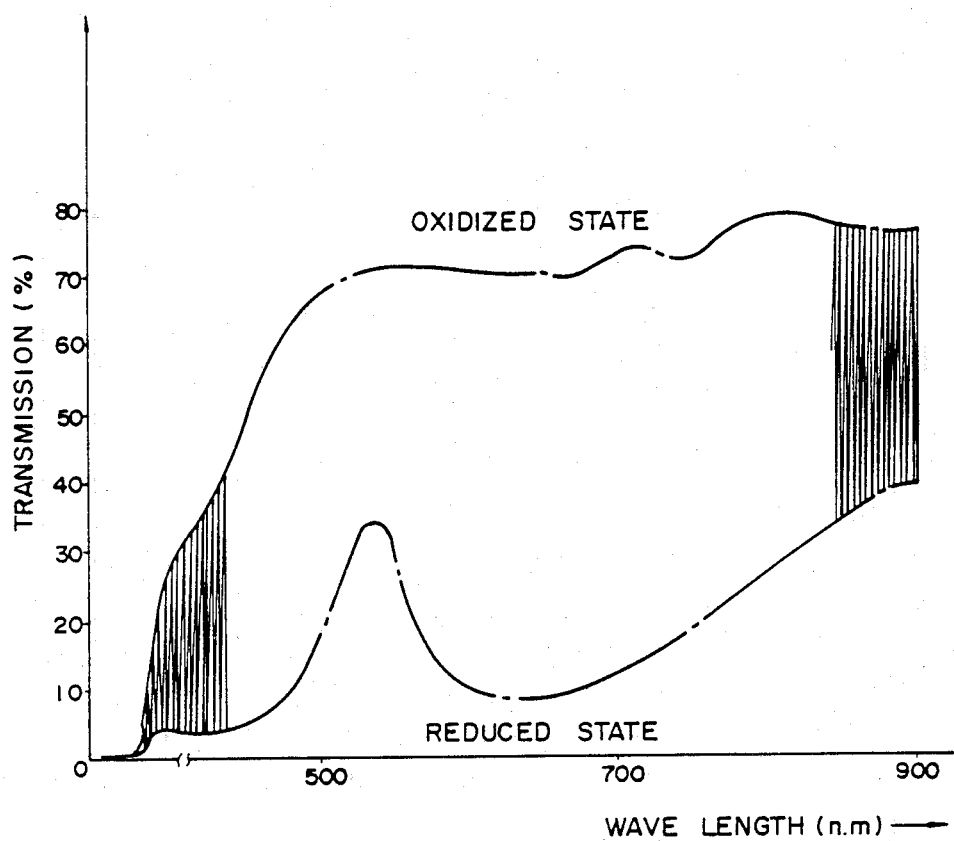
Figure 15:
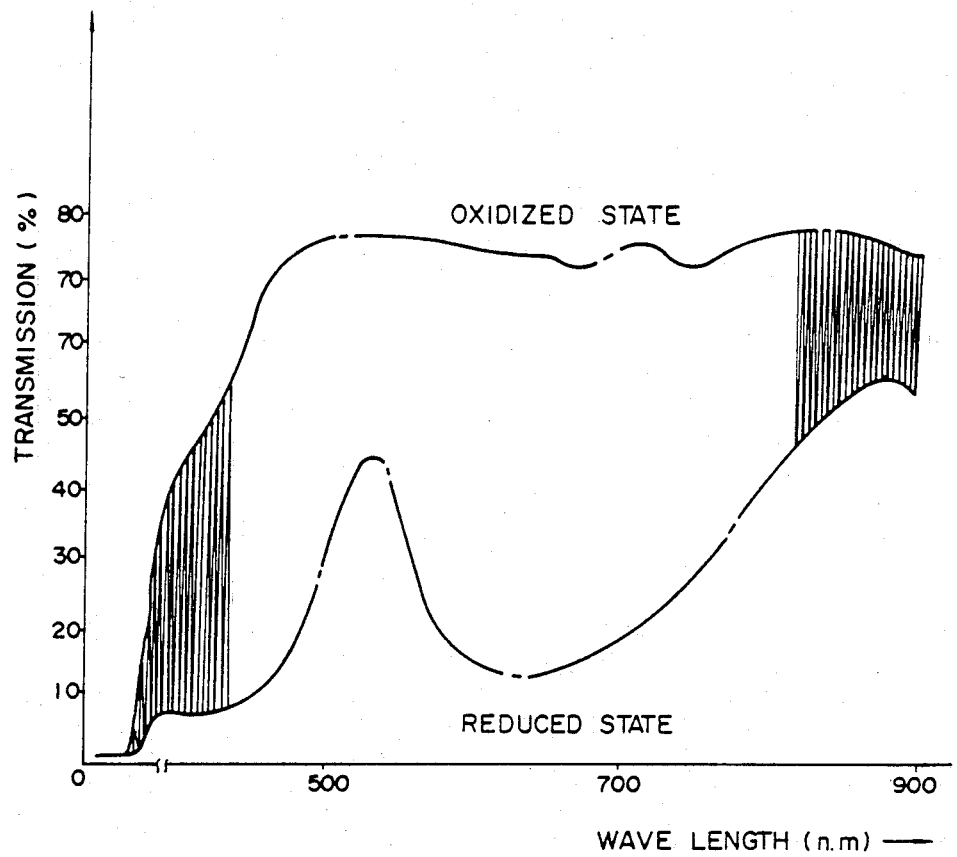

The results of the measurement of the transmission, similar to Example 1, are shown in FIGS. 14 and 15. In FIG. 14, $Vd_1 = +0.5$ V and $Vd_2 = -0.35$ V with a contrast C=70.1/8.2=8.55. In FIG. 15, $Vd_1 = +0.5$ V and $Vd_2 = -0.3$ V with a contrast C of 74.0/11.9=6.22.

EXAMPLE 4

The general procedure of Example 1 2 repeated except that $Na_4[Fe(CN)_6]$ was used as the auxiliary redox material and NaCl was used instead of KCl with the following formulation.

| | |
|---|---|
| Active Substance, p-CV2Cl | 0.02 M |
| Ancillary redox material, $Na_4[Fe(CN)_6]$ | 0.01 M |
| Electrolyte, $NaH_2PO_2$ | 1.0 M |
| NaCl | 0.5 M |

Figure 16:
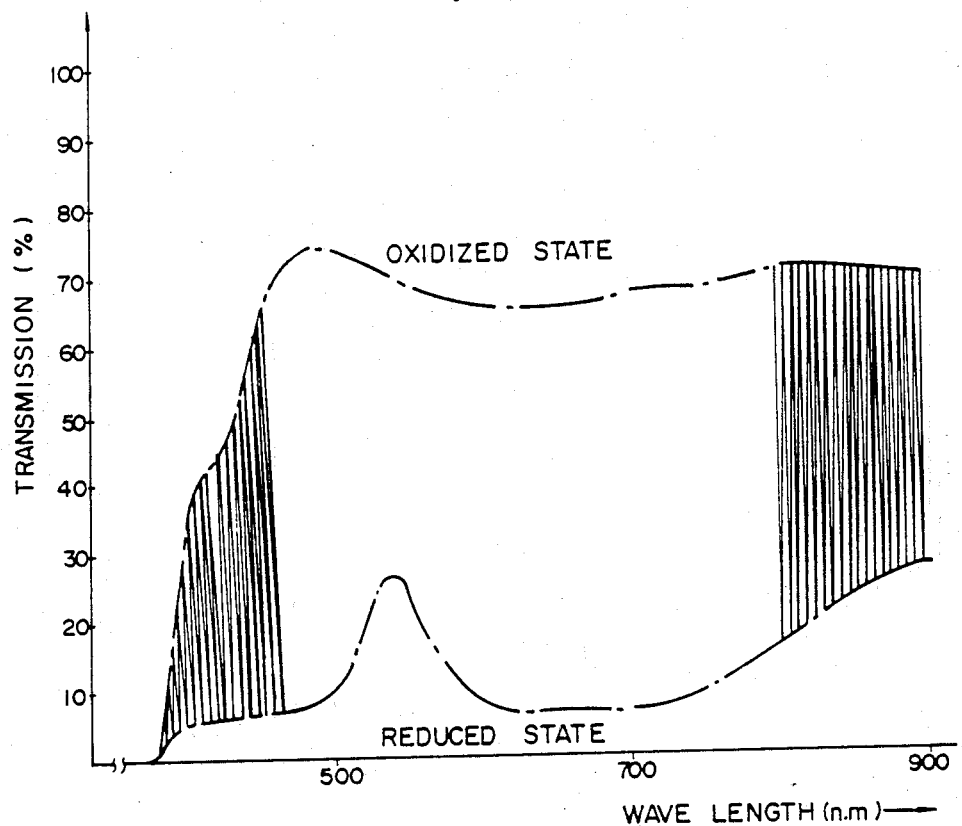
Figure 17:
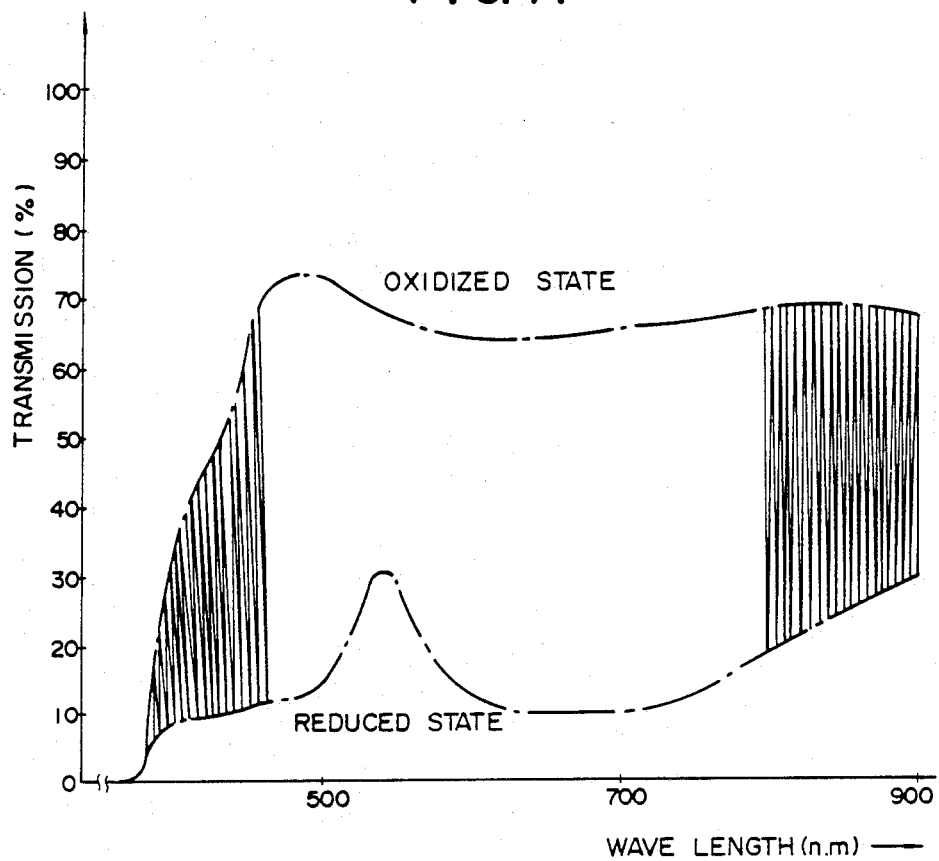

The results of the measurement of the transmission, similar to Example 1, are shown in FIGS. 16 and 17. In FIG. 17, $Vd_1 = +0.5$ V and $Vd_2 = -0.35$ V with a contrast C=65.1/6.7=9.72. In FIG. 17, $Vd_1 = +0.5$ V and $Vd_2 = -0.3$ V with a contrast C of 63.9/10.6=6.03.

COMPARATIVE EXAMPLE 1

An electrochromic solution having the following formulation was prepared.

| | |
|---|---|
| Active Substance, p-CV2Cl | 0.001 M |
| Ancillary redox material, $Na_4[Fe(CN)_6]$ | 0.1 M |
| Electrolyte, KCl | 1.0 M |

Figure 18:
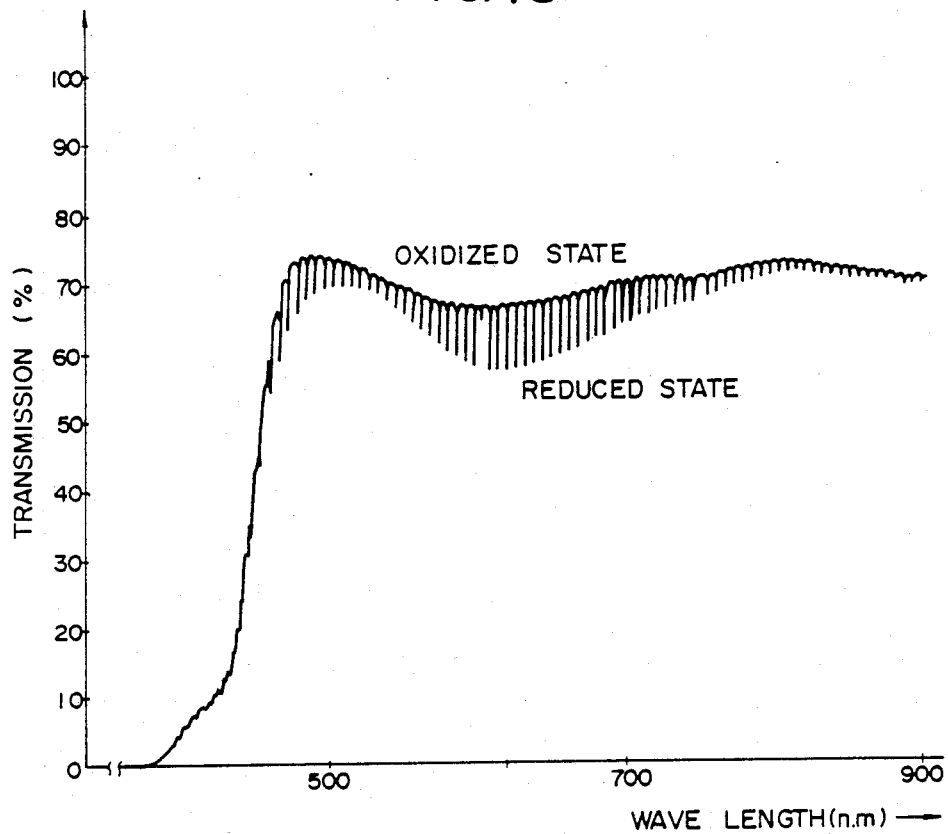
Figure 19:
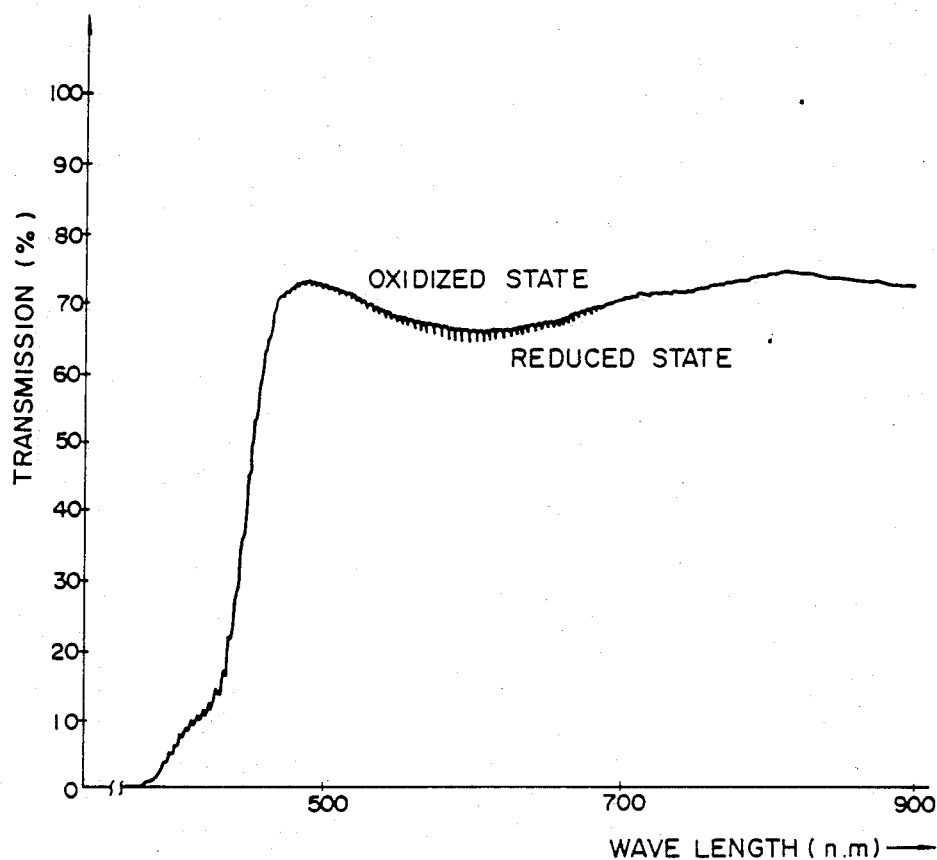
Figure 20:
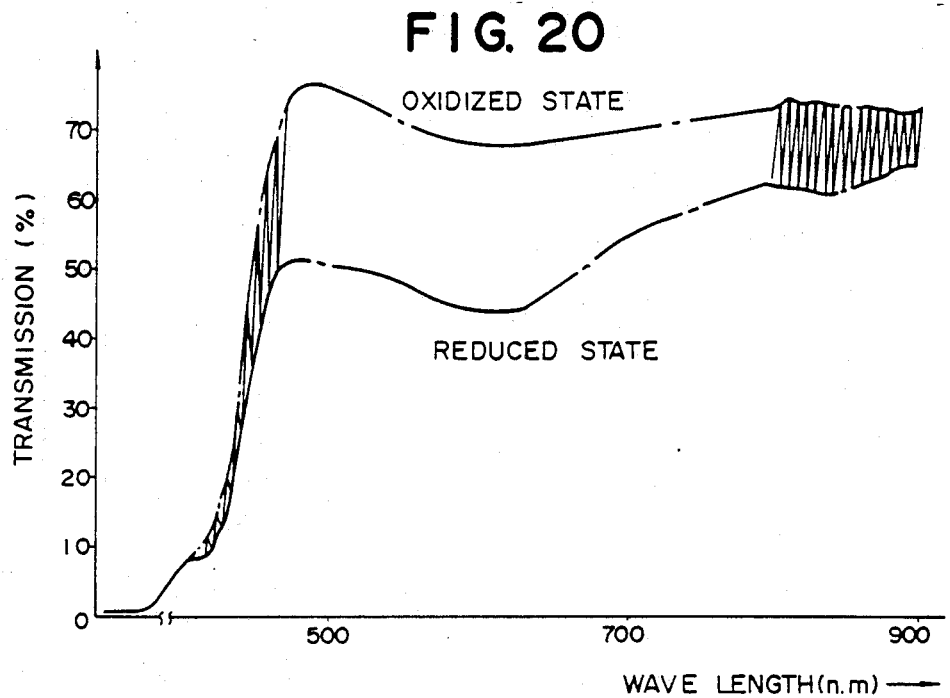
Figure 21:
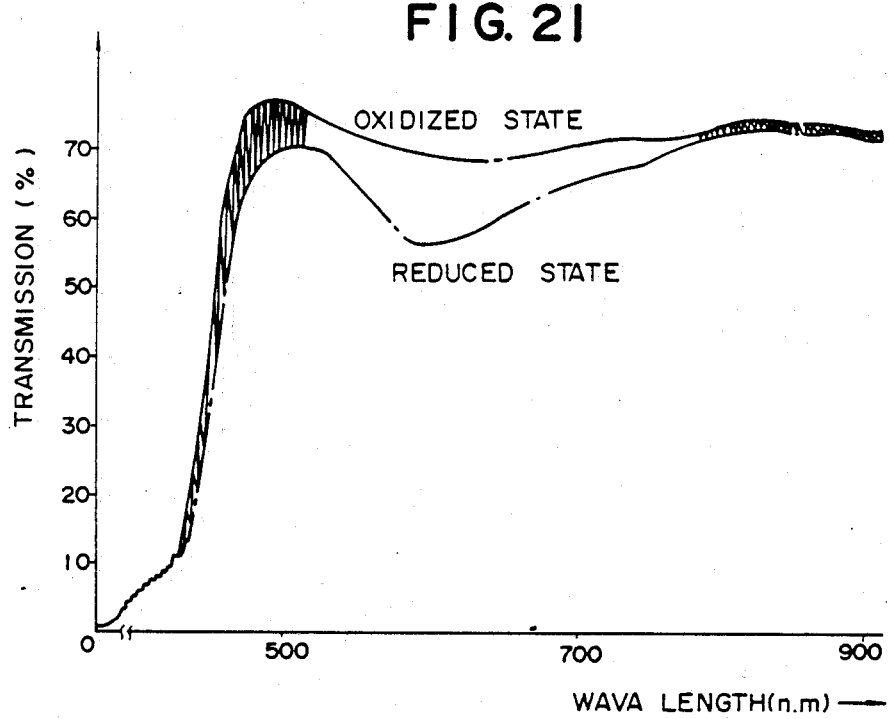

The results of the measurement of the transmission, similar to Example 1, are shown in FIGS. 18 through 21. FIG. 18 is the case where the cell was repeatedly applied with $Vd_1=0.5$ V at a pulse width of 2 seconds and $Vd_2=-0.45$ V at a pulse width of 4 seconds. The contrast C found to be C=67.0/57.0=1.18. FIG. 19 is the case where $Vd_1=0.5$ V and $Vd_2=-0.4$ V were repeatedly applied each at a pulse width of 2 seconds, with a contrast C=65.7/64.6=1.02. FIG. 20 is the case using $Vd_1=0.5$ V with a pulse width of 2 seconds and $Vd_2=-0.65$ V with a pulse width of 4 seconds. The contrast C was found to be 68.3/42.9=1.59. FIG. 21 is the case using $Vd_1=0.5$ and $Vd_2=-0.65$ V and a pulse width of 2 seconds in each case. The contrast C was found to be C=68.4/57.1=1.22.

COMPARATIVE EXAMPLE 2

Figure 22:
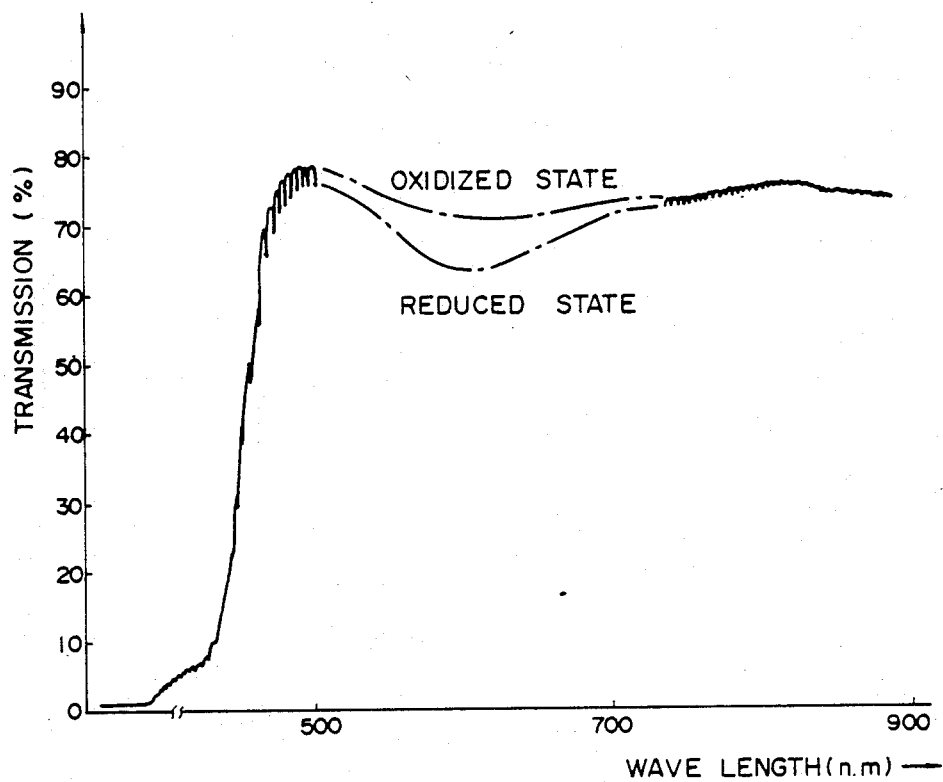
Figure 23:
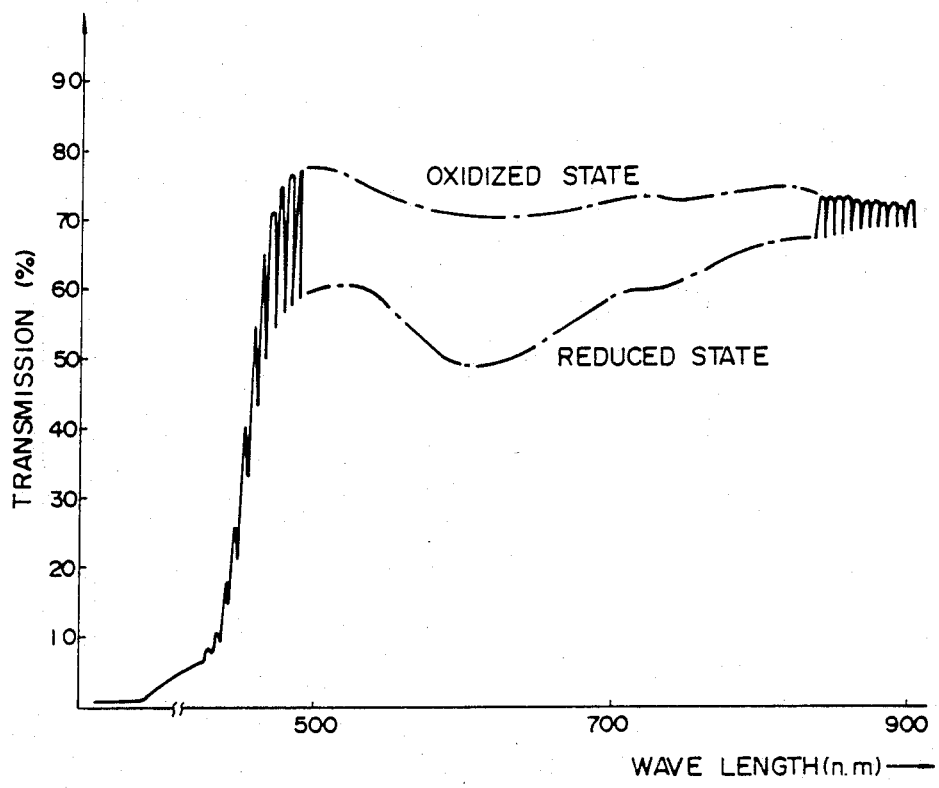

The general procedure of Comparative Example 1 was repeated using $K_4[Fe(CN)_6]$ instead of $Na_4[Fe(CN)_6]$. The results of measurement of the transmission are shown in FIGS. 22 and 23. FIG. 22 shows the case using $Vd_1=+0.5$ V and $Vd_2=0.65$ V and a pulse width of 2 seconds in each case. The contrast C was found to be C=68.4/57.1=1.10. Similarly, FIG. 23 shows the case using $Vd_1=+0.5$ V with a pulse width of 2 seconds and $Vd_2=-0.65$ with a pulse width of 4 seconds, in which the contrast C was found to be C=70.4/49.0=1.44.

As will be seen from the transmission characteristic of the examples and comparative examples, the contrast is much more improved over the contrast of the prior art cells illustrated in the comparative examples. When the concentration of p-CV is made so high as to be 0.005M or over, within which dark green color can be developed, but below 0.035M, the electrochromic solution is not colored to an extent that the display color is impeded without involving formation of flaky crystals.

In Table 3, the minimum amounts of KCl necessary for re-dissolving separated crystals are shown when amounts of an active substance (p-CV2Cl), an auxiliary redox material ($K_4[Fe(CN)_6]$) and an electrolyte ($NaH_2PO_2$) were changed.

TABLE 3

| p-CV/K$_4$[Fe(CN)$_6$] | NaH$_2$PO$_2$ | | |
|---|---|---|---|
| | 0 M | 0.5 M | 1.0 M |
| | KCl | KCl | KCl |
| 0.02 M/0.02 M | 0.70 M or over | 0.65 M or over | 0.60 M or over |
| 0.02 M/0.01 M | 0.60 M or over | 0.55 M or over | 0.50 M or over |
| 0.02 M/0.005 M | 0.50 M or over | 0.45 M or over | 0.45 M or over |
| 0.01 M/0.01 M | 0.35 M or over | 0.30 M or over | 0.25 M or over |
| 0.005 M/0.005 M | 0.30 M or over | 0.25 M or over | 0.25 M or over |

The above results reveal that KCl should be contained in amounts not less than 0.25M. This is true of the case where KCl is replaced by NaCl and $K_4[Fe(CN)_6]$ is replaced by $Na_4[Fe(CN)_6]$. In view of the results of Examples 1, 2, 3 and 4, NaCl and KCl have similar effects and $K_4[Fe(CN)_6]$ is the same as $Na_4[Fe(CN)_6]$ as applied in accordance with the present invention.

It was confirmed that KCl or NaCl could be used to a saturation.

In order to attain the life cycle over 10$^7$, the concentration of $NaH_2PO_2$ or $KH_2PO_2$ should be from not less than 0.5M to a saturation thereof.

What is claimed is:

1. An electrochromic display device which comprises a cell having facing electrodes, at least one of which is a display electrode and which are spaced from each other, and an electrochromic solution filled between and in contact with the paired electrodes in a sealed manner, said electrochromic solution comprising an aqueous solution of an N,N'-di(p-cyanophenyl)-4,4'-bipyridinium dihalide as an active substance, an alkali ferrocyanide as an auxiliary redox material, and an electrolyte consisting of a hypophosphite ion and a salt corresponding to the salt obtained from the anion of the active substance and the alkali ion of the auxiliary redox material, said active substance being used in an amount of 0.005 to 0.035 M, said hypophosphite being used in an amount not less than 0.5M, said salt being used in an amount not less than 0.25M.

2. An electrochromic display device according to claim 1, wherein said facing electrodes are each formed on a glass substrate and said display electrode has an insulative masking layer which has been removed according to a desired pattern to be displayed.

3. An electrochromic display device according to claim 1, wherein said active substance is N,N'-di(p-cyanophenyl)-4,4'-bipyridinium dichloride.

4. An electrochromic display device according to claim 1, wherein said active substance is N,N'-di(p-cyanophenyl)-4,4'-bipyridinium dibromide.

5. An electrochromic display device according to claim 1, wherein the hypophosphite ion is derived from sodium hypophosphite or potassium hypophosphite.

6. An electrochromic display device according to claim 1, wherein said salt is sodium chloride or potassium chloride.

7. An electrochromic display device according to claim 1, wherein the hypophosphite ion is used in amounts up to a saturation thereof.

8. An electrochromic display device according to claim 1, wherein said salt is used in amounts up to a saturation thereof.

* * * * *